(12) United States Patent
Stork et al.

(10) Patent No.: US 6,444,766 B1
(45) Date of Patent: Sep. 3, 2002

(54) METHOD FOR PRODUCING CARRIER-BORNE CATALYSTS

(75) Inventors: Martin Stork, Hamm; Klaus Müllen, Köln; Markus Klapper, Mainz; Matthias Koch, Wiesbaden; Heike Gregorius, Bad Kreuznach; Ursula Rief, Heddesheim; Marc Oliver Kristen, Limburgerhof, all of (DE)

(73) Assignees: Basell Polyolefine GmbH, Ludwigshafen (DE); Max-Planck-Gesellschaft, Munich (DE)

( * ) Notice: Subject to any disclaimer, the term of this patent is extended or adjusted under 35 U.S.C. 154(b) by 0 days.

(21) Appl. No.: 09/674,957

(22) PCT Filed: May 12, 1999

(86) PCT No.: PCT/EP99/03270

§ 371 (c)(1),
(2), (4) Date: Nov. 8, 2000

(87) PCT Pub. No.: WO99/60035

PCT Pub. Date: Nov. 25, 1999

(30) Foreign Application Priority Data

May 18, 1998 (DE) .................................. 198 21 949

(51) Int. Cl.[7] .................................................. C08F 4/64
(52) U.S. Cl. ..................... 526/170; 502/103; 502/109; 502/152; 526/160; 526/943; 526/165
(58) Field of Search ................................. 502/103, 109, 502/152; 526/160, 170, 943

(56) References Cited

U.S. PATENT DOCUMENTS 6,187,880 B1 * 2/2001 Welch et al.

FOREIGN PATENT DOCUMENTS

| EP | 295 312 | 12/1988 |
|---|---|---|
| GB | 909 279 | 10/1962 |
| WO | 94/28034 | 12/1994 |
| WO | 98/01481 | 1/1998 |

* cited by examiner

Primary Examiner—David W. Wu
Assistant Examiner—Caixia Lu
(74) Attorney, Agent, or Firm—Keil & Weinkauf

(57) ABSTRACT

A process for preparing a supported catalyst comprises the steps of (1) preparation of a copolymer having comonomer units which comprise leaving groups; (2) polymer-analogous reaction with a substituted or unsubstituted cyclopentadienyl compound, and (3) reaction of the copolymer of (2) with a mono-Cp-metallocene compound.

12 Claims, No Drawings

METHOD FOR PRODUCING CARRIER-BORNE CATALYSTS

The present invention relates to a process for preparing a supported catalyst. It also relates to supported metallocene catalysts obtainable by this process, to a novel copolymer as support material for metallocene catalysts, and to a process for polymerizing olefins in the presence of a catalyst of the invention.

Supported transition metal catalysts have long been known and are employed, for example, for polymerizing olefins. The activity and productivity of these catalysts is critically dependent on their preparation process. The support materials for such transition metal catalysts are usually crosslinked polymers or inorganic substances such as silica gel, for example. Examples of such supported catalysts are described, for example, in WO 94/28034, in EP-A1-295 312, and in WO 98/01481.

The fixing of metallocenes to the surface of inorganic materials, and the subsequent polymerization, may, however, be accompanied by a number of deleterious effects. It is difficult, for instance, to distribute the catalyst component homogeneously over the surface of the porous support material. In the course of polymerization, there is generally fragmentation of the catalyst and of the support material. Owing to the nonhomogeneous distribution of the catalyst components over the surface of the support, in turn, this fragmentation produces nonhomogeneous catalyst particles, which can adversely affect the polymerization product.

It is therefore an object of the present invention to find a process for preparing a supported catalyst without the disadvantages of the prior art and allowing homogeneous distribution of the catalyst components on the support material.

We have found that this object is achieved by a process for preparing a supported catalyst, comprising the steps of
(1) preparing a copolymer comprising at least monomer units I and II

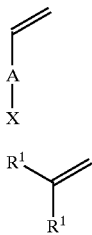

I

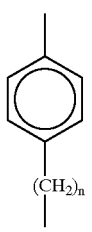

II where
A is a direct chemical bond or a group

X is a substitutable leaving group,
$R^1$ is identical or different at each occurrence and is hydrogen, substituted or unsubstituted aryl or branched or unbranched alkyl or alkenyl, and
n is an integer from 1 to 8;

(2) reacting in polymer-analogous manner the copolymer obtained in (1) with a cyclopentadienyl compound III or a fulvene compound IIIa

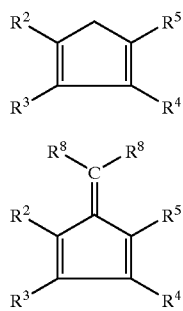

III

IIIa to give a corresponding copolymer in which at least some of the leaving groups X have been replaced by radicals III' or III'a

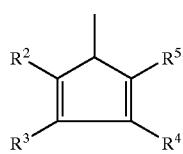

III'

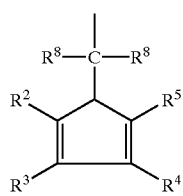

III'a where independently of one another
$R^2$, $R^3$, $R^4$ and $R^5$ are hydrogen, $C_1$–$C_{10}$-alkyl, or substituted or unsubstituted phenyl, or one of them is —$QR^6R^7X^2$ in which
Q is carbon, $CR^6R^7C$, germanium or silicon,
$R^6$ and $R^7$ independently of one another are hydrogen, methyl, ethyl or phenyl, and
$X^2$ is halogen, methyl, methoxy or ethoxy; and
$R^8$ radicals are identical or different $C_1$- to $C_4$-alkyl radicals or substituted or unsubstituted phenyl, and (3) reacting the modified copolymer obtained in (2) with a compound IV or IVa $$CpM(X^3)_3 \quad\quad IV$$
$$M(X^3)_4 \quad\quad IVa$$

where
Cp is a substituted or unsubstituted cyclopentadienyl radical,
M is Ti, Zr or Hf, and
$X^3$ is halogen, hydrogen, $C_1$–$C_{10}$-alkyl, $C_1$–$C_{10}$-alkoxy or amido, it being possible for different substituents $X^3$ to have different meanings.

We have also found a supported metallocene catalyst obtainable by this process, a copolymer obtainable by steps 1 and 2 of the process of the invention, as a support material for metallocene catalysts, and a process for polymerizing olefins in the presence of the catalyst of the invention.

In step 1 of the process of the invention a copolymer is first prepared which is used as a starting material for the catalyst support. This copolymer comprises at least the monomer units I and II. Of these, monomer unit II serves as the framework of the support material. The monomer unit I, on the other hand, has the function of introducing a substitutable leaving group into the copolymer, which can subsequently be modified by polymer-analogous reaction with a cyclopentadienyl compound or a fulvene compound. In addition to the comonomers I and II, it is possible for any other olefinic comonomers to be employed in the copolymerization of step (1) provided they do not interfere disruptively with the reactions of steps (2) and (3). Examples that may be mentioned are acrylates or methacrylates, or acrylonitriles or methacrylonitriles. These additional comonomers may, for example, modify the polarity of the copolymeric supports in a desired manner.

A in the formula I can be a direct chemical bond but is preferably p-benzylene or p-phenylene.

Suitable examples of the substitutable leaving group X are the nucleophilically substitutable leaving groups such as the halogens—i.e. fluorine, chlorine, bromine or iodine—or other nucleophilically substitutable leaving groups familiar to the person skilled in the art, such as tosylate, trifluoroacetate, acetate or azide, for example. A monomer unit I preferred in the case of nucleophilically substitutable leaving groups X being used is p-(chloromethyl)styrene.

The substituted leaving group X can also be an organometallic functional group such as Li or $MgX^4$, where $X^4$ is halogen, i.e., fluorine, chlorine, bromine or iodine. In general, the copolymers containing organometallic functional groups are prepared not by addition polymerization of the corresponding monomers I and II but instead by addition polymerization of comonomers II and suitable comonomers I' which can be converted into the corresponding monomer units I by means of polymer-analogous reactions. Examples of suitable monomers I' are p-halostyrenes, of which p-bromostyrene is particularly preferred.

Of the radicals $R^1$ in the formula II preferably at least one is a substituted or unsubstituted phenyl, pyrenyl, naphthyl or alkenyl. Preferred monomers II are styrene, butadiene or isoprene.

To prepare the copolymer by step I of the process it is possible to employ two or more different comonomers I or I' and two or more different comonomers II. Good results are also obtained, however, when only one compound I or I' is copolymerized with one compound II. The proportions of the comonomers I or I' and II can be varied within a wide range. It is common to employ a larger proportion of the comonomer II.

The amount of the comonomer I as a proportion of the overall copolymer is advantageously from 3 to 30% by weight, based on the overall mass of the copolymer, with particular preference from 5 to 20% by weight and, in particular, from 7 to 15% by weight.

In step 2 of the process of the invention the copolymer obtained in step 1 is reacted in polymer-analogous manner with a cyclopentadienyl compound III or with a fulvene compound IIIa.

The cyclopentadienyl compound III can be either unsubstituted cyclopentadiene or mono- to tetrasubstituted cyclopentadienes. Particularly suitable substituents $R^2$ to $R^5$ are $C_1$–$C_{10}$-alkyls, in other words methyl, ethyl and the various isomers of propyl, butyl, pentyl, hexyl, heptyl, octyl, nonyl and decyl. Other suitable radicals $R^2$ to $R^5$ are substituted or unsubstituted phenyls, especially unsubstituted phenyls. In addition, one of $R^2$ to $R^5$ can also be $—QR^6R^7X^2$, where Q is especially silicon, $R^6$ and $R^7$ are especially methyl, and $X^2$ is halogen, methyl, methoxy or ethoxy. Particular preference is given to a group $—QR^6R^7X^2$ of the formula $—Si(CH_3)_2X^2$. Such a group can be used to construct a bridged metallocene structure on the copolymer framework. The preferred cyclopentadienyl compound III for use in step 2 of the process, however, is unsubstituted cyclopentadiene.

Suitable fulvene compounds IIIa include not only fulvene compounds unsubstituted on the 5-membered ring but also fulvene compounds substituted from 1 to 4 times on the 5-membered ring, the radicals which come into consideration being the same as those for the cyclopentadienyl compounds III. Preferred fulvenes IIIa are unsubstituted on the 5-membered ring. The fulvenes IIIa are substituted twice by radicals $R^8$ on the methylene carbon, suitable substituents being in particular methyl, ethyl or the various isomers of propyl or phenyl. One particularly preferred fulvene IIIa is dimethylfulvene.

The polymer-analogous reaction in step 2 of the process can be carried out by various techniques familiar to the person skilled in the art.

If the substitutable leaving group X is a nucleophilically substitutable leaving group, the polymer-analogous reaction of step 2 of the process takes place in general with a cyclopentadienyl compound III. In general, the cyclopentadiene compound is then converted into the cyclopentadienyl anion by means of a strong base such as butyllithium or by means of elemental alkali metal, such as sodium. This cyclopentadienyl anion can then be used, in a nucleophilic substitution reaction, to substitute a suitable nucleophilically substitutable leaving group X on the comonomer unit I.

If the leaving group X is an organometallic functional group, the reaction of step 2 of the process takes place usually with a fulvene compound IIIa. In this case, a polymer-analogous reaction then gives rise to copolymers having radicals III'a.

In the subsequent step of the process, step 3, the modified copolymer obtained in step 2 is reacted with a metallocene compound IV or IVa.

Suitable compounds IV are all known monocyclopentadienyl compounds. The central atom M can be titanium, zirconium or hafnium, zirconium being particularly preferred. A suitable cyclopentadienyl radical is any substituted or unsubstituted cyclopentadienyl radical—thus not only unsubstituted cyclopentadienyl but also cyclopentadienyl radicals substituted one or more times by $C_1$–$C_{10}$-alkyls, including in particular methyl-, ethyl-, propyl- or butyl-substituted cyclopentadienyl radicals, or else more complex ring systems including a cyclopentadienyl ring. Particularly preferred cyclopentadienyl radicals IV are mono- or dialkylcyclopentadienyl or substituted or unsubstituted fluorenyl, indenyl or tetrahydroindenyl. Mention may also be made of cyclopentadienyl radicals modified with the chlorodimethylsilyl group. Metallocene complexes having such a cyclopentadienyl structure can be used to prepare bridged supported metallocenes.

In step 3 of the process it is also possible to employ compounds IVa. Suitable as the central atom M of these compounds $M(X^3)_4$ are titanium, zirconium or hafnium, particular preference being given to titanium.

The groups $X^3$ in formula IV or IVa are preferably halogen, especially chlorine. $X^3$ can, however, also be hydrogen, $C_1$–$C_{10}$-alkyl, $C_1$–$C_{10}$-alkoxy or amido, especially methyl.

Preferred compounds IV are cyclopentadienylzirconium trichloride or n-butylcyclopentadienylzirconium trichloride.

A preferred compound IVa is tetrabenzyltitanium.

The process of the invention for preparing supported catalysts has numerous advantages. First of all, the solubility of the copolymer as obtained by step 1 of the process in organic solvents allows homogeneous distribution of metallocene centers on the copolymer framework. In the course of the polymer-analogous reaction, however, there is not only modification of the polymer framework with metallocene centers but also crosslinking of the polymer chains by means of a Diels-Alder reaction of the cyclopentadienyl radicals. The crosslinked polymer is predominantly insoluble in organic solvents and in this form is suitable for use in polymerization reactions, in the gas phase or in suspension. This insoluble supported catalyst can be fragmented on exposure to heat—for example, in the course of the polymerization reaction or during subsequent processing steps such as in an extrusion, with reformation of the soluble copolymer chains in accordance with a retro-Diels-Alder reaction. The supported catalyst fragmented in this way is able to be distributed in a particularly homogeneous manner in the resulting polymer.

Like the supported metallocene catalyst obtainable by the process of the invention, the copolymer obtainable by steps 1 and 2 of the process has not hitherto been disclosed. This copolymer can be used as a support material for a wide variety of metallocene catalysts.

The supported metallocene catalysts of the invention are suitable, for example, for polymerizing olefins and especially for polymerizing α-olefins, i.e. hydrocarbons having terminal double bonds. Suitable monomers can be functionalized olefinically unsaturated compounds such as ester derivatives or amide derivatives of acrylic or methacrylic acid, examples being acrylates, methacrylates or acrylonitrile. Preference is given to nonpolar olefinic compounds, including aryl-substituted α-olefins. Particularly preferred α-olefins are linear or branched $C_2$–$C_{12}$-alk-1-enes, especially linear $C_2$–$C_{10}$-alk-1-enes such as ethylene, propylene, 1-butene, 1-pentene, 1-hexene, 1-heptene, 1-octene, 1-nonene, 1-decene or 4-methyl-1-pentene or substituted or unsubstituted vinylaromatic compounds of the formula

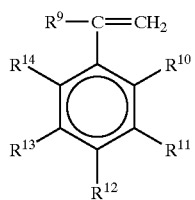

V where the substituents are defined as follows:
$R^9$ is hydrogen or $C_1$- to $C_4$-alkyl, preferably hydrogen;
$R^{10}$ to $R^{14}$ independently of one another are hydrogen, $C_1$- to $C_{12}$-alkyl, $C_6$- to $C_{18}$-aryl or halogen, or where two adjacent radicals together are groups having 4 to 15 carbon atoms; preferably hydrogen, $C_1$- to $C_4$-alkyl, chloro, phenyl, biphenyl, naphthalene or anthracene or where two adjacent radicals together are groups having 4 to 12 carbon atoms, so that examples of compounds of the formula V which result are naphthalene derivatives or anthracene derivatives.

Examples of preferred vinylaromatic monomers are styrene, p-methylstyrene, p-chlorostyrene, 2,4-dimethylstyrene, 4-vinylbiphenyl, vinylnaphthalene or vinylanthracene.

It is also possible to polymerize mixtures of different α-olefins.

In particular, the supported metallocene catalysts of the invention can be employed in various processes for polymerizing ethylene, propylene or styrene. In addition to the homopolymerization of ethylene, propylene or styrene, the supported catalysts of the invention are particularly suitable for copolymerization, since they lead to uniform incorporation of the comonomer into the polymer and, in general, to narrow molecular weight distributions. Comonomers used in the ethylene polymerization are preferably $C_3$- to $C_8$-α-olefins, especially butene, pentene, hexene and/or octene. Preferred comonomers for the polymerization of propylene are ethylene and/or butene.

The polymerization process of the invention is generally carried out at temperatures in the range from −50 to 300° C., preferably from 0 to 150° C., and under pressures in the range from 0.5 to 3000 bar, preferably from 1 to 80 bar.

The polymerization can be conducted in solution, in suspension, in liquid monomers or in the gas phase. It is preferably conducted in liquid monomers, in suspension or by a gas-phase process, preference being given to processes in a stirred gas phase or in a gas-phase fluidized bed.

EXAMPLES

Example 1

Preparing Styrene-p-chloromethylstyrene Copolymers 46.9 g (0.45 mol) of styrene, 7.63 g (0.05 mol) of p-chloromethylstyrene and 500 mg of AIBN were dissolved in 50 ml of absolute toluene and the solution was carefully devolatilized. After 12 hours at 70° C., it was diluted with 100 ml of toluene and the product was precipitated from 1.8 l of methanol. The copolymer was washed with 200 ml of methanol, isolated by filtration and dried under reduced pressure at 70° C. for 48 h.

Yield: 40.8 g (75% of theory)
$^1$H-NMR: 1.03–2.47 m, 4.52 s, 6.17–7.56 m

By integrating the NMR signals the content of chloromethylstyrene in the polymer was calculated as 10.5 mol-%.

A series of polymers having different chloromethylstyrene contents was synthesized analogously. The results are given in Table 1.

TABLE 1

| Example | Initial weight of styrene (mol) | Initial weight of p-chloromethylstyrene (mol) | Yield (g) | % chloromethylstyrene in the polymer |
|---|---|---|---|---|
| 1.1. | 0.45 | 0.05 | 40.8 (75% of theory) | 10.5 |
| 1.2. | 0.46 | 0.014 | 33.2 (66% of theory) | 2.8 |
| 1.3. | 0.42 | 0.041 | 34.5 (69% of theory) | 9.2 |
| 1.4. | 0.47 | 0.025 | 42.2 (79% of theory) | 5.0 |
| 1.5. | 0.18 | 0.03 | 15.1 (63% of theory) | 15.3 |

Example 2

Preparing the Cyclopentadiene-containing Copolymers:

Example 2.1

Polymer with 10.5% Cyclopentadiene Content 5 g of the polymer from Example 1.1 (10.5% chloromethylstyrene content) were dried under a high vacuum for 4 h together with 2.1 g (92 mmol≅20 eq.) of bright sodium wire. Then 80 ml of THF were added, and 3.0 g (46 mmol≅10 eq.) of cyclopentadiene were added dropwise at −10° C. After 20 h the batch was concentrated to 40 ml and the product was precipitated from 1.6 l of methanol at −10° C. After an hour of stirring and a further 4 h at −10° C., the copolymer was filtered off and dried under a high vacuum for 36 h (−5° C.).

$^1$H-NMR: 0.56–2.51 m, 2.80 s, 2.96 s, 3.26 s, 5.57–7.93 m

As far as it is possible to ascertain from the $^1$H-NMR spectrum, complete reaction of all chloromethyl groups has taken place.

Example 2.2

Polymer with 5% Cyclopentadiene Content

In a procedure analogous to that of 2.1., 5 g of the polymer from Example 1.4. were employed and the amounts of sodium and cyclopentadiene were reduced in accordance with the chloromethyl content.

Example 3

Preparing Metallocene-comprising Polymers

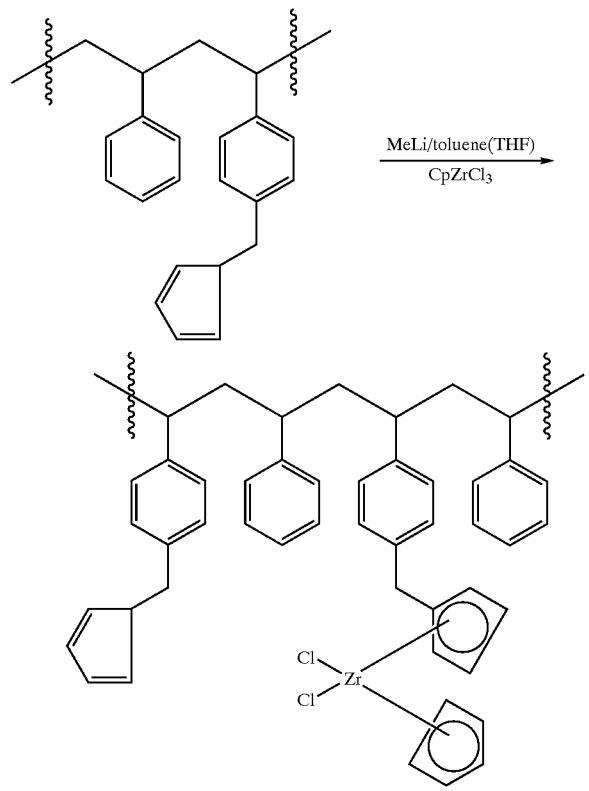

Example 3.1

6.25 ml (10 mmol=20 eq.) of methyllithium were added dropwise at −10° C. to a solution of 1 g of polymer from Example 2.1 in 30 ml of toluene. After 12 h, 130 mg of CpZrCl$_3$ were added at −10° C. to the Cp polymer anion solution. After 12 h of stirring, the product was precipitated from 800 ml of dry hexane at room temperature. After a further 6 h of stirring, it was filtered off under inert gas and dried under a high vacuum at room temperature for 4 h.

The product showed the following bands in the IR spectrum: 3081, 3025, 2924, 2850, 1622, 1601, 1583, 1493, 1452, 1000, 852, 758, 698, 465

A series of further zirconocene-comprising polymers was synthesized by this method.

The results are given in Table 2.

| Example | polymer employed from Example | Cp content of the support polymer (μmol/g polymer) | Zr content of the polymer (μmol/g polymer) |
| --- | --- | --- | --- |
| 3.1. | 2.1. | 900 | 100 |
| 3.2. | 2.2. | 500 | 75 |
| 3.3. | 2.3. | 500 | 250 |
| 3.4. | 2.4. | 500 | 500 |

Polymerizing ethylene

Example 4.1

A stirred 1 l steel autoclave was flushed carefully with nitrogen, conditioned at the polymerization temperature of 70° C. and then charged with 450 ml of isobutane and 2.5 ml of MAO (1.53 molar in toluene). Then 50 mg of the catalyst from Example 3.2. were flushed in with a further 20 ml of isobutane, and ethylene was injected to a total pressure of 38 bar. The pressure in the autoclave was kept constant by adding further ethylene. After 90 minutes the polymerization was discontinued by letting down the autoclave. The polymer was obtained in the form of a free flowing coarse powder.

Example 4.2

The procedure of Example 4.1. was repeated except that the catalyst with the 2.5 ml of MAO (1.53 M in toluene) was activated beforehand in a nitrogen-flushed flask for 30 minutes and then flushed into the polymerization reactor with isobutane.

| Example | Yield [g of polymer] | Productivity [g of polymer/g of catalyst] | η [as per ISO 1628-3] [dl/g] |
| --- | --- | --- | --- |
| 4.1. | 5.2 | 100 | 7.41 |
| 4.2. | 6.4 | 130 | 7.50 |

Example 5

Preparation of a Styrene-p-bromostyrene Copolymer 18.0 g (0.173 mol) of styrene, 3.5 g (0.019 mol) of p-bromostyrene and 40 mg of AIBN were dissolved in 20 ml of absolute toluene and carefully degassed. After stirring at 70° C. for 24 hours, the mixture was diluted with 50 ml of toluene and precipitated from 1 l of methanol. The polymer was filtered off, washed with 100 l of methanol and dried under reduced pressure for 48 hours.

Yield: 16.4 g (76% of theory)

Example 6

Preparation of a Cyclopentadiene Copolymer 2.5 g of the copolymer from Example 5 were dissolved in 250 ml of THF. 1.4 ml of a 1.6 molar solution of n-butyllithium in hexane were added at −78° C. and the mixture was stirred at this temperature for 0.5 h. Subsequently, 0.234 g (2.2 mmol) of dimethylfulvene was added slowly. After 0.5 h, cooling was removed and stirring was continued at room temperature for one hour more. Subsequently, the reaction mixture was concentrated to 40 ml and precipitated from 1 l of methanol at −10° C. After stirring for one hour and a further 4 h at −10° C., the copolymer was filtered off and dried under a high vacuum at −5° C. for 36 h.

We claim:

1. A process for preparing a supported catalyst, comprising the steps of (1) preparing a copolymer comprising at least monomer units I and II

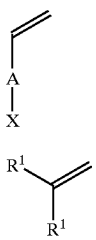

I

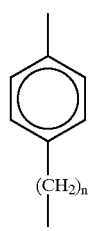

II where

A is a direct chemical bond or a group

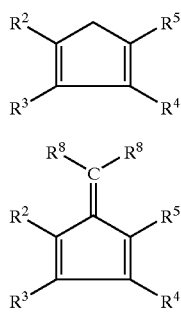

X is a substitutable leaving group, $R^1$ is identical or different at each occurrence and is hydrogen, substituted or unsubstituted aryl or branched or unbranched alkyl or alkenyl, and n is an integer from 1 to 8, (2) reacting in polymer-analogous manner the copolymer obtained in (1) with a cyclopentadienyl compound III or a fulvene compound IIIa

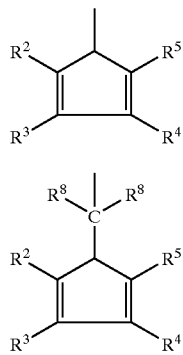

III

IIIa to give a corresponding copolymer in which at least some of the leaving groups X have been replaced by radicals III' or III'a

III'

III'a

where independently of one another $R^2$, $R^3$, $R^4$ and $R^5$ are hydrogen, $C_1$–$C_{10}$-alkyl, or substituted or unsubstituted phenyl, or one of them is —$QR^6R^7X^2$ in which Q is carbon, $CR^6R^7C$, germanium or silicon, $R^6$ and $R^7$ independently of one another are hydrogen, methyl, ethyl or phenyl, and $X^2$ is halogen, methyl, methoxy or ethoxy; and $R^8$ radicals are identical or different $C_1$- to $C_4$-alkyl radicals or substituted or unsubstituted phenyl, and (3) reacting the modified copolymer obtained in (2) with a compound IV or IVa $$CpM(X^3)_3 \quad \text{IV}$$

$$M(X^3)_4 \quad \text{IVa}$$

where

Cp is a substituted or unsubstituted cyclopentadienyl radical,

M is Ti, Zr or Hf, and $X^3$ is halogen, hydrogen, $C_1$–$C_{10}$-alkyl, $C_1$–$C_{10}$-alkoxy or amido, it being possible for different substituents $X^3$ to have different meanings.

2. The process of claim 1, wherein one or more radicals $R^1$ in formula II are substituted or unsubstituted phenyl, pyrenyl, naphthyl or alkenyl.

3. The process of claim 1, wherein styrene, butadiene or isoprene is employed as monomer unit II.

4. The process of claim 1, wherein X in formula I is halogen, tosylate, trifluoroacetate, acetate or azide.

5. The process of claim 1, wherein X in formula I is Li or $MgX^4$, where $X^4$ is halogen.

6. The process of claim 5, wherein the copolymer obtained in (1) is reacted with dimethylfulvene.

7. The process of claim 1, wherein the copolymer obtained in (1) is reacted with unsubstituted cyclopentadiene.

8. The process of claim 1, wherein one of $R^2$ to $R^6$ in compound III or IIIa is a group —$Si(CH_3)_2X^2$, where $X^2$ is halogen, methyl, methoxy or ethoxy.

9. The process of claim 1, wherein Cp in formula IV is mono- or dialkylcyclopentadienyl or substituted or unsubstituted fluorenyl, indenyl or tetrahydroindenyl.

10. A supported metallocene catalyst obtained by the process of claim 1.

11. A copolymer obtained by steps (1) and (2) of the process as defined in claim 1, as a support material for metallocene catalysts.

12. A process for polymerizing olefins which comprises carrying out the process in the presence of a catalyst as defined in claim 10.

* * * * *

UNITED STATES PATENT AND TRADEMARK OFFICE
CERTIFICATE OF CORRECTION

PATENT NO.    : 6,444,766 B1
DATED         : September 3, 2002
INVENTOR(S)   : Stork et al.

It is certified that error appears in the above-identified patent and that said Letters Patent is hereby corrected as shown below:

Column 10,
Line 53, "$R^6$" should be -- $R^5$ --.

Signed and Sealed this

Fourteenth Day of January, 2003

JAMES E. ROGAN
*Director of the United States Patent and Trademark Office*